United States Patent
Tatsumura et al.

(10) Patent No.: US 8,321,421 B2
(45) Date of Patent: Nov. 27, 2012

(54) STORAGE DEVICE HAVING FULL-TEXT SEARCH FUNCTION

(75) Inventors: Kosuke Tatsumura, Kawasaki (JP); Atsuhiro Kinoshita, Kamakura (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 12/888,897

(22) Filed: Sep. 23, 2010

(65) Prior Publication Data

US 2011/0246451 A1  Oct. 6, 2011

(30) Foreign Application Priority Data

Mar. 31, 2010 (JP) .................................. 2010-082881

(51) Int. Cl.
- *G06F 7/00* (2006.01)
- *G06F 17/00* (2006.01)
- *G06F 17/30* (2006.01)

(52) U.S. Cl. .......................... 707/742; 707/781; 707/830

(58) Field of Classification Search ................... 707/711, 707/741; 711/108

See application file for complete search history.

(56) References Cited

U.S. PATENT DOCUMENTS

| | | | | |
|---|---|---|---|---|
| 6,377,500 | B1 | 4/2002 | Fujimoto et al. | 365/230.01 |
| 7,007,015 | B1* | 2/2006 | Nayak | 1/1 |
| 7,752,193 | B2* | 7/2010 | Weber | 707/711 |
| 8,090,723 | B2* | 1/2012 | Cao et al. | 707/741 |
| 2005/0027932 | A1* | 2/2005 | Thayer | 711/108 |

FOREIGN PATENT DOCUMENTS

| | | |
|---|---|---|
| JP | 5-298231 A | 11/1993 |
| JP | 2000-215678 A | 8/2000 |
| JP | 2001-249943 A | 9/2001 |
| JP | 2003-271626 A | 9/2003 |
| JP | 2000122814 A | 4/2008 |
| JP | 2008158993 A | 7/2008 |
| JP | 2009-140302 A | 6/2009 |
| JP | 2009-181577 A | 8/2009 |

OTHER PUBLICATIONS

Zobel, et al.; *Inverted Files Versus Signature Files for Text Indexing*; ACM Transactions on Database Systems (TODS), vol. 23, Iss. 4, pp. 453-490, Dec. 1998.

Japanese Office Action dated Apr. 3, 2012 for corresponding Japanese Patent Application No. 2010-082881 with English translation.

Office Action dated Dec. 6, 2011 from corresponding JP 2010-082881.

(Continued)

*Primary Examiner* — Susan Chen

(74) *Attorney, Agent, or Firm* — Ohlandt, Greeley, Ruggiero & Perle, L.L.P.

(57) ABSTRACT

According to one embodiment, a storage device includes an interface, a first and second memory blocks and a controller. The interface receives a content search request. The first memory block stores files and inverted files corresponding to contents included in the files. The second memory block stores a file search table. The controller creates the inverted file for each content included in the files and stores IDs of the files including the content in the inverted file. The controller obtains, by search of the content, a corresponding inverted file from the inverted files stored in the first memory block and stores, in the file search table, the IDs of the files included in the obtained inverted file. The controller outputs the IDs of the files stored in the file search table from the interface as a search result for the content search request.

11 Claims, 16 Drawing Sheets

OTHER PUBLICATIONS

Japanese Office Action dated Jul. 10, 2012 from corresponding JP 2010-082881.

T. Kawazoe; "Memory Technology Evolving According to Usage"; Monthly ASCII Dot Technologies, ASCII Media Works Inc., Oct. 1, 2009, vol. 14, No. 10, pp. 44 to 51.

S. Yada; "Searching System for large Scale n-gram Data by Transposed Files"; Information Processing Conference Report, H.21, 2, [CD-ROM[, Information Processing Society of Japan, Aug. 15, 2009, pp. 1 to 6.

* cited by examiner

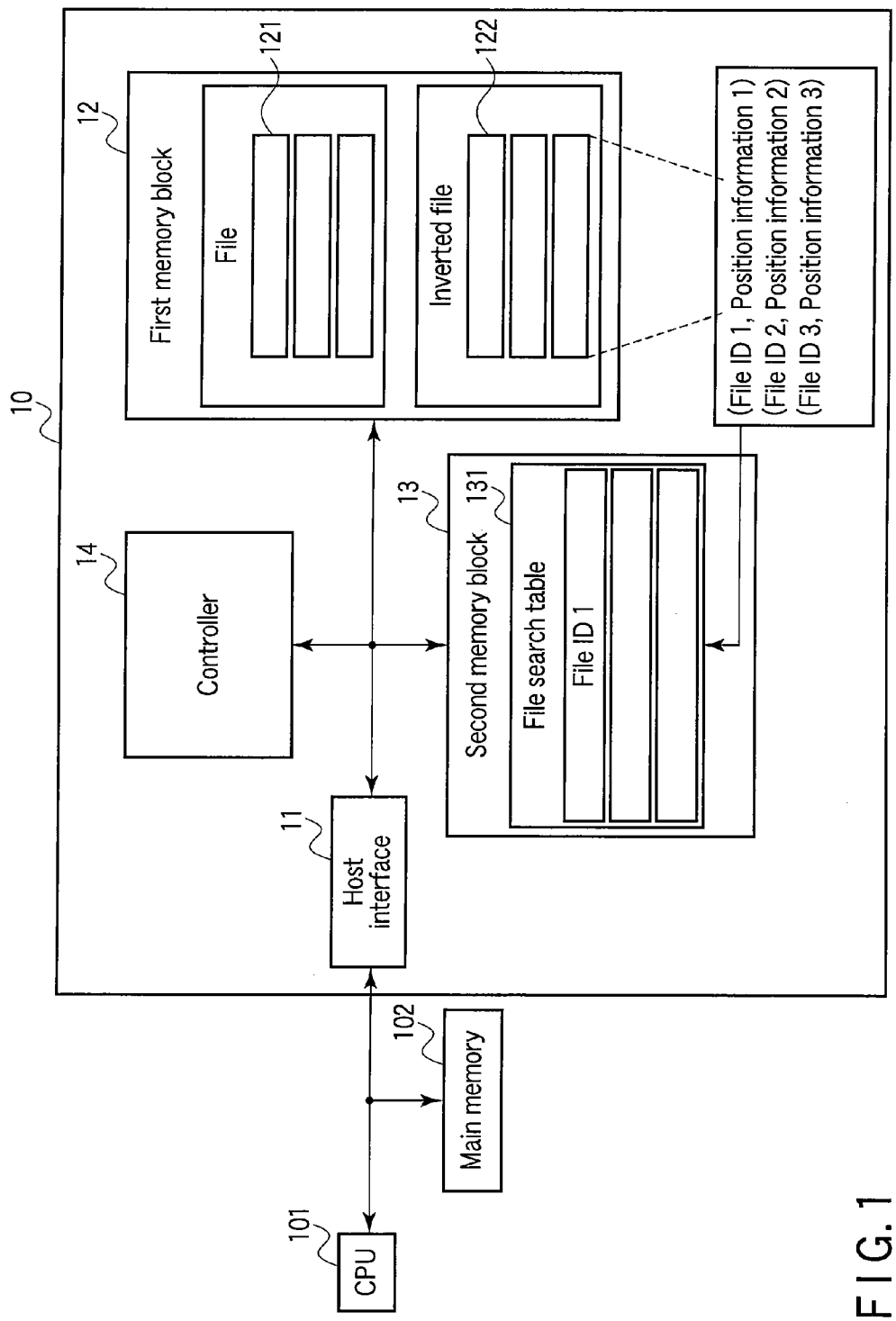
F I G. 1

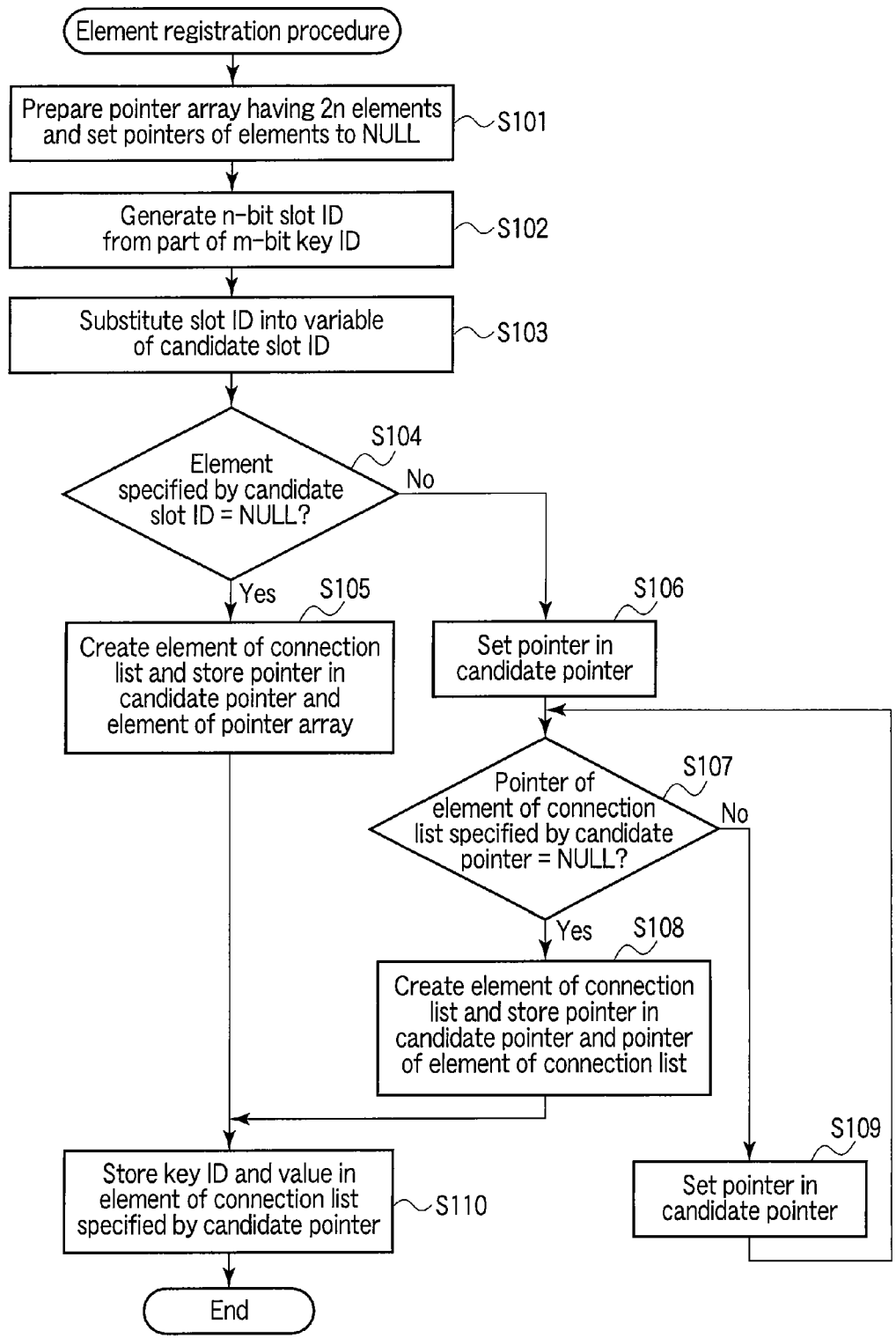
F I G. 13

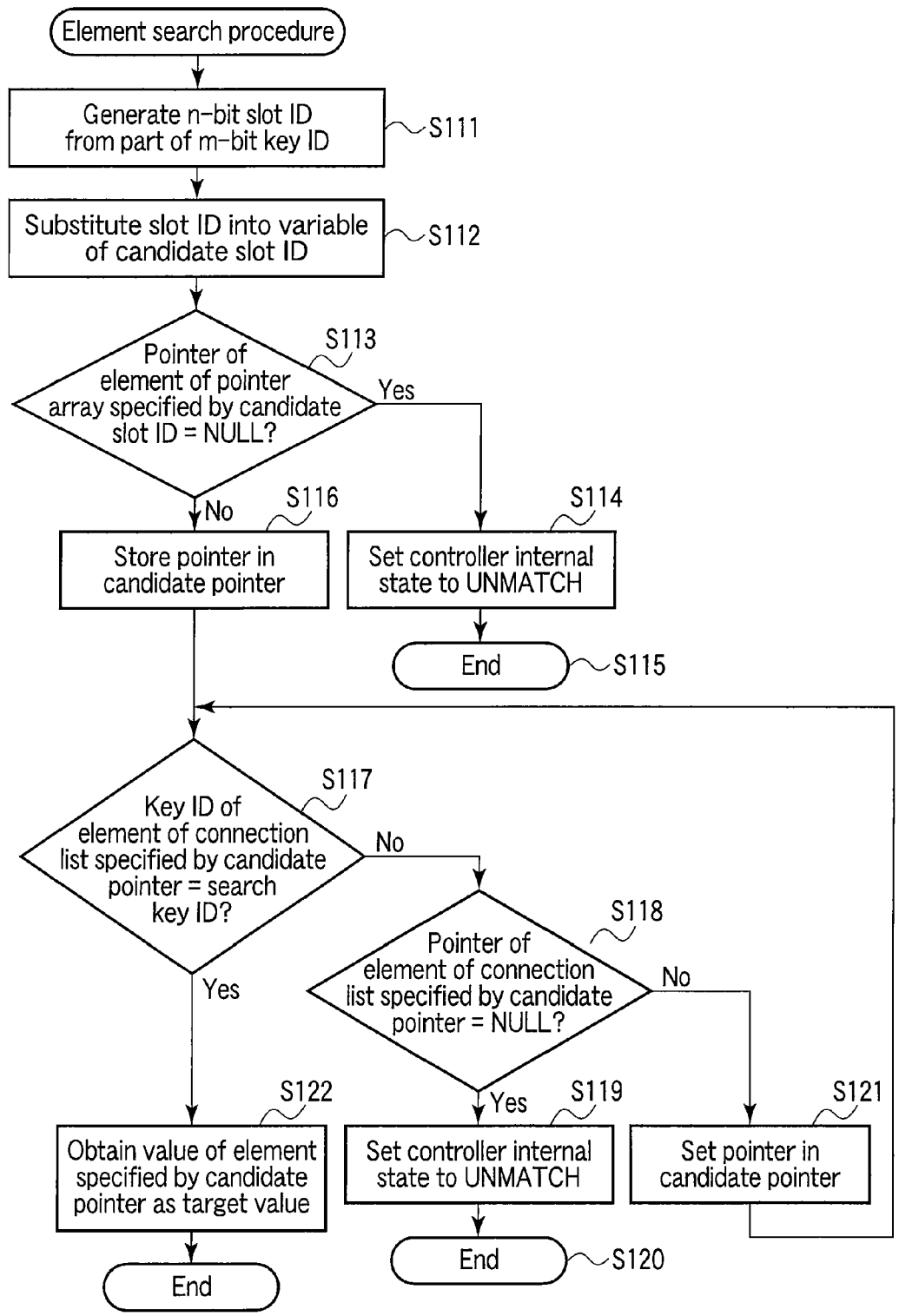
F I G. 14

STORAGE DEVICE HAVING FULL-TEXT SEARCH FUNCTION

CROSS-REFERENCE TO RELATED APPLICATIONS

This application is based upon and claims the benefit of priority from Japanese Patent Application No. 2010-082881, filed Mar. 31, 2010; the entire contents of which are incorporated herein by reference.

FIELD

Embodiments described herein relate generally to a storage device to be accessed by a host system and, for example, to a storage device access method and a data management method.

BACKGROUND

A general host system, for example, a computer system includes a nonvolatile large-scale storage device such as a magnetic hard disk drive (HDD) or a solid-state drive (SSD) with a nonvolatile semiconductor memory.

The storage device includes, for example, an interface, first memory block, second memory block, and controller (for example, U.S. Pat. No. 6,377,500).

The first memory block stores files. The second memory block serves as a buffer memory for write/read. The first memory block is a nonvolatile large-capacity storage, as compared to the second memory block, but its access speed is low. The second memory block is used to compensate for the difference between the communication speed of the interface and the write/read speed of the first memory block. For example, the first memory block is a nonvolatile flash memory array, and the second memory block is a volatile DRAM or SRAM.

The problem of the conventional storage device is that it has no full-text search function by itself. A full-text search function searches stored files for files including a search target content in response to a content search request, and outputs a list of them. Such content is normally comprised of words. The storage device preferably has an advanced function of receiving, as an input, a Boolean operation request including AND/OR/NOT for a plurality of content search results and outputting a file list representing the Boolean operation result.

Methods of implementing the full-text search function include the inverted index method (for example, J. Zobel, A. Moffat and K. Ramamohanarao, Inverted files versus signature files for text indexing. ACM Transactions on Database Systems (TODS), Volume 23, Issue 4 (December 1998), Pages: 453-490). In the inverted index method, an index data file called an inverted file is created for each content in advance, which stores a list of files including the content. The description of the inverted file is updated every time a file is added or deleted. For a content search request, the description of an inverted file corresponding to the search target content is output as a search result. It is therefore unnecessary to check the descriptions of all files in each full-text search.

Conventionally, to implement the full-text search function using a storage device, management of inverted files stored in the storage and Boolean operation for a plurality of content search results need to be done using the central processing unit (CPU) or main memory (DRAM) of the host system.

However, since the communication speed between the host system and the storage device is limited by the communication speed of the host interface, inverted file management or Boolean operation cannot be performed at a high speed.

BRIEF DESCRIPTION OF THE DRAWINGS

FIG. 1 is a block diagram showing the hardware configuration of a storage device according to a first embodiment;

FIG. 13 is a flowchart illustrating an element registration procedure (second example) according to the third embodiment;

FIG. 14 is a flowchart illustrating an element search procedure (second example) according to the third embodiment;

DETAILED DESCRIPTION

Figure 2:
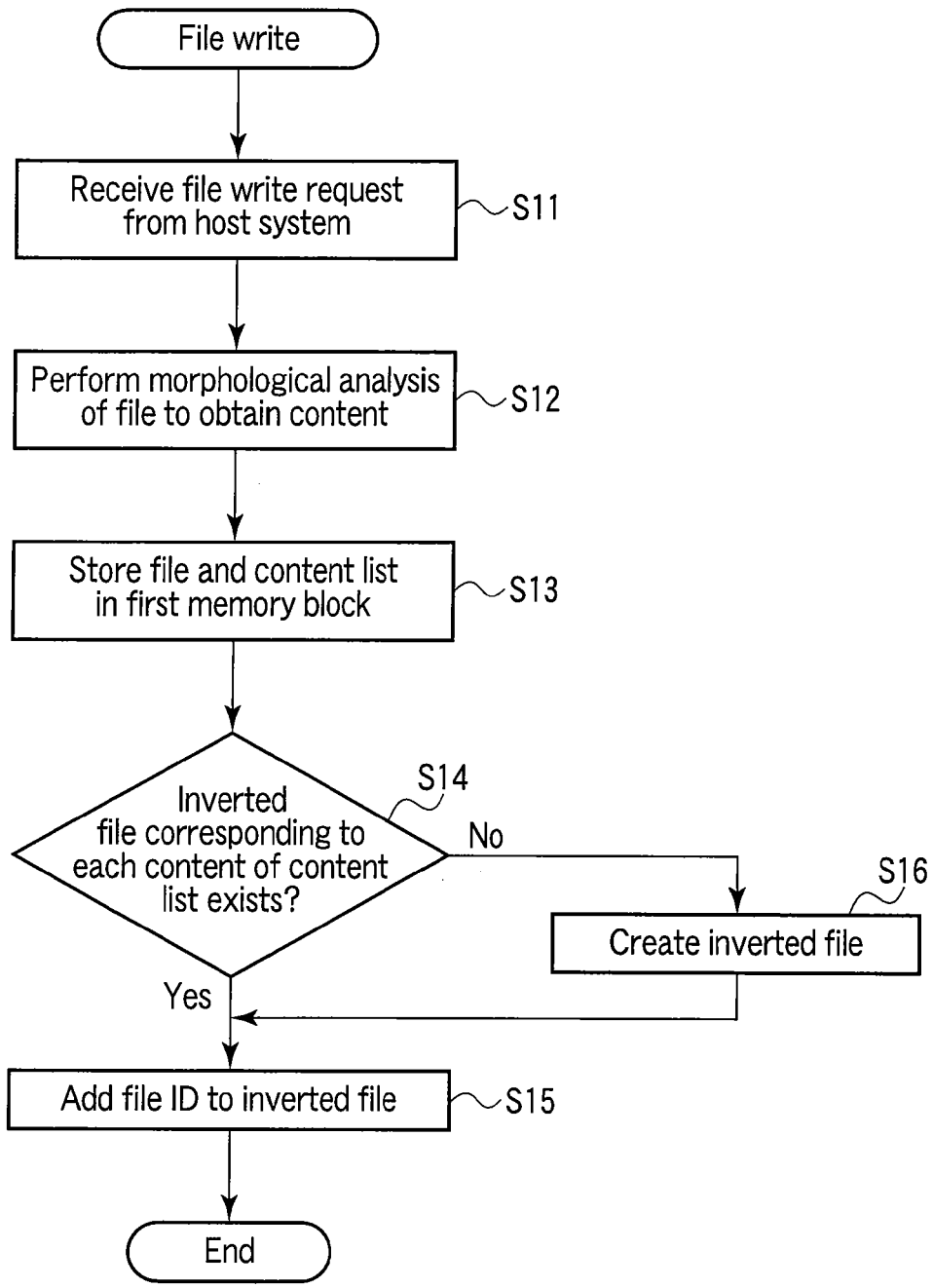
FIG. 2 is a flowchart illustrating file write processing in the storage device according to the first embodiment.

In general, according to one embodiment, a storage device includes an interface, a first memory block, a second memory block and a controller. The interface is configured to receive a content search request. The first memory block is configured to store files and inverted files corresponding to contents included in the files. The second memory block is configured to store a file search table. The controller is configured to control operations of the interface, the first memory block, and the second memory block. The controller creates the inverted file for each content included in the files and stores IDs of the files including the content in the inverted file. The controller obtains, by search of the content, a corresponding inverted file from the inverted files stored in the first memory block and stores, in the file search table, the IDs of the files included in the obtained inverted file. The controller outputs the IDs of the files stored in the file search table from the interface as a search result for the content search request.

Terms used in this specification will be described prior to the explanation of the embodiments.

"Content" means a word or a number in a natural language in many cases. For example, a text "This is a book" includes "This", "is", "a", and "book" as contents. Note that as described above, a content means a word or a number in a natural language in many cases, but can also arbitrarily be defined in accordance with the application purpose. For example, a specific bit pattern in a binary file may be defined as a content. In a moving image file, a specific image pattern such as a person may be defined as a content. In an audio file, a specific audio pattern such as an audio pattern characteristic to a scene change may be defined as a content.

"File" is a general file including contents. It indicates, for example, a file including a text or a file including a text and other information unique to an application.

"Morphological Analysis" is processing of extracting contents from a file and separating them.

"File ID" is an identifier capable of specifying a file in the storage device. File IDs include, for example, a file name representing a full path in a hierarchical directory structure and an inode number serving as a file ID used in many file systems. Alternatively, using a hash generator which converts arbitrary length bit data into fixed length bit data using a hash function, fixed length bit data may be generated from arbitrary length bit data capable of specifying a file and used as a file ID.

"Inverted File" is a file that is created for each content and stores the identifier of the file including the content. The inverted file may include the position information of the content in the file.

An example of the inverted file will be described next. Assume that there are two files, i.e., File 1: "This is a book", and File 2: "This is a bag". The File ID of File 1 is set to 0×001, and the File ID of File 2 is set to 0×002. The position (pos) of a content in a file is represented by the content appearance order using 0 as the origin. An inverted file stores a set of a File ID and content position information in the file, i.e., (File ID, pos). At this time, the description of an inverted file corresponding to "This" is {(0×001,1), (0×002,1)}. This inverted file indicates that the content "This" is located at the first position in the file having the File ID "0×001" and at the first position in the file having the File ID "0×002".

"Inverted File ID" is an identifier capable of specifying the inverted file in the storage device. An example is fixed length bit data which is generated from a content using a hash generator which converts arbitrary length bit data into fixed length bit data using a hash function.

The embodiments will now be described with reference to the accompanying drawing. In the description, the same reference numerals denote the same parts throughout the drawing.

[1] First Embodiment
[1-1] Hardware Configuration

The hardware configuration of a storage device according to the first embodiment will be explained first.

FIG. 1 is a block diagram showing the hardware configuration of a storage device according to the first embodiment.

As shown in FIG. 1, a storage device 10 includes a host interface 11, first memory block 12, second memory block 13, and controller 14. Note that a host system including a CPU 101 and a main memory 102 is connected to the storage device 10. Examples of the host system are a personal computer, cellular phone, digital camera, and personal digital assistance (PDA).

The host interface 11 receives a content search request from the host system as an input, and outputs a content search result to the host system. The host interface 11 also receives, as an input, a file write/read request with a designated address. For a write request, the host interface 11 also receives a file as an input. For a read request, the host interface 11 outputs a file corresponding to the designated address.

The first memory block 12 stores files 121, the content list of the files 121, and inverted files 122 corresponding to contents. Each inverted file 122 stores a list of file IDs of the files 121 including a content. The inverted file 122 may also include the position information of the content in each file 121.

The second memory block 13 stores a file search table 131. The file search table 131 stores a list of file IDs of the files 121 obtained by content search. The second memory block 13 has a buffer memory for write/read.

The first memory block 12 is a nonvolatile large-capacity storage, as compared to the second memory block 13, but its access speed is low. The second memory block 13 is used to compensate for the difference between the communication speed of the host interface 11 and the access speed of the first memory block 12. For example, the first memory block 12 is a nonvolatile flash memory array, and the second memory block is a volatile DRAM or SRAM.

The controller 14 controls signal transmission/reception between the host interface 11, first memory block 12, and second memory block 13. The controller 14 executes content search processing in response to a content search request input to the host interface 11. The controller 14 then outputs a content search result via the host interface 11. For a write request, the controller 14 writes the file 121 at a position in the first memory block 12 corresponding to the designated address. In read, the controller 14 reads out the file 121 from a position corresponding to the designated address.

[1-2] File Management and Content Search Processing

File management and content search processing in the storage device according to the first embodiment will be described next.

The host system inputs file write, deletion, and update requests to the storage device 10 via the host interface 11. On occasion, the host system inputs a content search request to the storage device 10 via the host interface 11. Upon receiving the content search request, content search processing is performed in the storage device 10, and a content search result is output to the host system via the host interface 11.

Processes in the storage device 10 will be described below in the order of search target file write, search target file deletion, search target file update, and content search.

[1-2-1] File Write/Deletion/Update
(File Write)

FIG. 2 is a flowchart illustrating file write processing in the storage device according to the first embodiment.

(1) The host interface 11 receives a file write request from the host system (step S11). The host system inputs a file and its storage address to the host interface 11. The controller 14 performs morphological analysis of the file input from the host system to obtain a content list (step S12). The morphological analysis is processing of decomposing a file into contents.

(2) The controller 14 stores, in the first memory block 12, the file 121 and the content list obtained from the file 121 (step S13).

(3) The controller 14 checks for each content of the content list whether the first memory block 12 stores the inverted file 122 corresponding to the content (step S14). If the inverted file already exists, the file ID of the file 121 including the content is added to the inverted file 122 (step S15). On the other hand, if no inverted file exists, the controller creates the inverted file (step S16). Then, the file ID of the file 121 including the content is described in the created inverted file (step S15).

In the above-described example, the controller 14 performs morphological analysis of the file. However, the CPU 101 of the host system may perform the morphological analysis. In this case, the processing is executed in the following way.

(1) The host system performs morphological analysis of a file to obtain a content list. The host system inputs the file, its storage address, and the content list to the storage device 10.

(2) The controller 14 stores, in the first memory block 12, the file 121 and the content list acquired from the file.

(3) The controller 14 checks for each content of the content list whether the first memory block 12 stores the inverted file 122 corresponding to the content. If the inverted file already exists, the file ID of the file 121 including the content is added to the inverted file 122. On the other hand, if no inverted file exists, the controller creates the inverted file. Then, the file ID of the file 121 including the content is described in the created inverted file.

(File Deletion)

Figure 3:
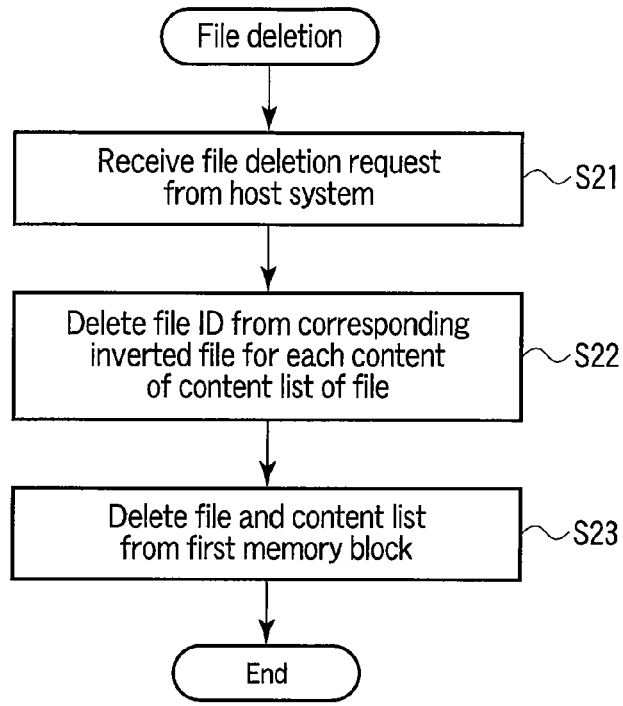
FIG. 3 is a flowchart illustrating file deletion processing in the storage device according to the first embodiment.

FIG. 3 is a flowchart illustrating file deletion processing in the storage device according to the first embodiment.

(1) The host interface 11 receives a file deletion request from the host system (step S21). The controller 14 deletes the file ID of the deletion target file from the inverted file 122 corresponding to each content in accordance with a content list obtained from the deletion target file stored in the first memory block 12 (step S22).

(2) The controller 14 deletes the deletion target file and the content list from the first memory block 12 (step S23).

Figure 4:
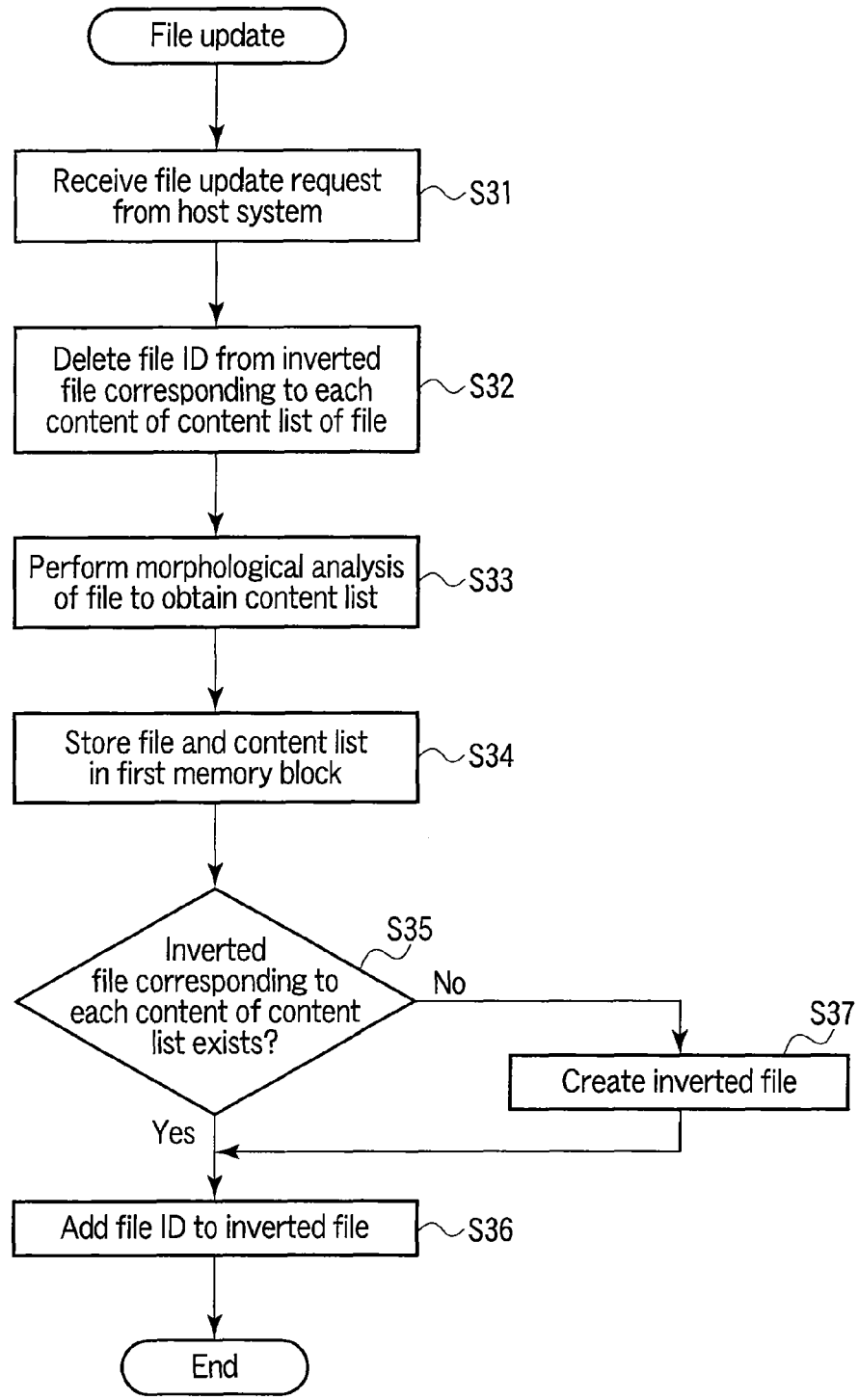
FIG. 4 is a flowchart illustrating file update processing in the storage device according to the first embodiment.

(File Update) FIG. 4 is a flowchart illustrating file update processing in the storage device according to the first embodiment.

(1) The host interface 11 receives a file update request from the host system (step S31). The host system inputs an updated file and its storage address to the host interface 11.

(2) The controller 14 deletes the file ID of the file before update from the inverted file corresponding to each content in accordance with a content list obtained from the file before update stored in the first memory block 12 (step S32).

(3) The controller 14 performs morphological analysis of the updated file input from the host system to obtain a content list (step S33).

(4) The controller 14 stores, in the first memory block 12, the updated file and the content list obtained from the updated file (step S34).

(5) The controller 14 checks for each content of the content list whether the first memory block 12 stores the inverted file 122 corresponding to the content (step S35). If the inverted file already exists, the file ID of the file 121 including the content is added to the inverted file 122 (step S36). On the other hand, if no inverted file exists, the controller creates the inverted file (step S37). Then, the file ID of the file 121 including the content is described in the created inverted file (step S36).

[1-2-2] Content Search Processing

Content search processing (full-text search function) in the storage device according to the first embodiment will be described next.

Figure 5:
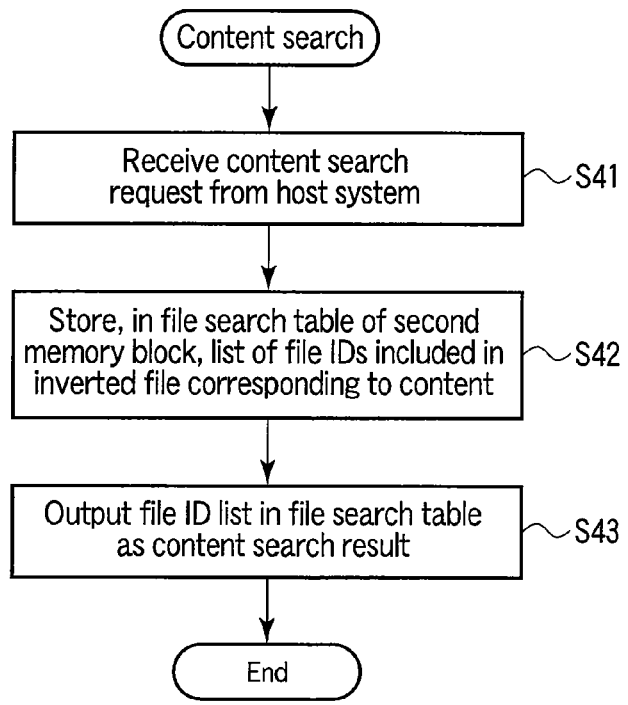
FIG. 5 is a flowchart illustrating content search processing in the storage device according to the first embodiment.

FIG. 5 is a flowchart illustrating content search processing in the storage device according to the first embodiment.

(1) The host interface 11 receives a content search request from the host system (step S41). The controller 14 stores, in the file search table 131 of the second memory block 13, a list of file IDs stored in the inverted file corresponding to the search target content (step S42).

(2) The controller 14 outputs the file ID list stored in the file search table 131 via the host interface 11 as a content search result (step S43).

According to the first embodiment, since the controller in the storage device performs inverted file management and content search processing, these processes can be executed at a high speed without being limited by the communication speed of the host interface. In content search, an inverted file is accessed. This enables to obtain a content search result without scanning all files in each search. That is, it is possible to implement a storage device having a full-text search function by itself in addition to the functions of the conventional storage device.

Software for performing inverted file management and search by a Boolean operation using a resource (CPU or DRAM) of a host system that manages a storage device does exist. However, its use raises the following three problems.

(1) The load on the resources of the host system is heavy. This problem is particularly serious for a mobile application where a host device has only limited resources. (2) The scalability is absent. The load on the resources of the host system increases as the number of storage devices increases. (3) The portability is low. If the method of implementing inverted file management and search by a Boolean operation depends on the host system, even a removable storage device cannot use the full-text search function on an arbitrary host system.

This embodiment can solve these problems. That is, when a host device searches for a content, the load on the resources of the host system can be reduced. In addition, concerning content search, even when the number of storage devices increases, the load on the resources of the host system never increases.

Furthermore, since the storage device performs inverted file management and search by a Boolean operation, the full-text search function can be used on an arbitrary host system.

[2] Second Embodiment

A storage device according to the second embodiment will be described next.

The storage device according to the second embodiment can perform Boolean operation processing including AND/OR/NOT for a plurality of content search results, in addition to the processes of the first embodiment.

Upon receiving, via the host interface, a Boolean operation request including AND/OR/NOT for a plurality of content search results, the controller rewrites the description of the file search table to obtain a result for the Boolean operation request. The controller then outputs the Boolean operation result, i.e., content search result via the host interface.

[2-1] Hardware Configuration

The hardware configuration of the storage device according to the second embodiment is the same as in the above-described first embodiment, and a description thereof will not be repeated.

[2-2] Content Search Processing (Processing for Boolean Operation Search Request)

Content AND/OR/NOT search processing in the storage device according to the second embodiment will be described.

Figure 6:
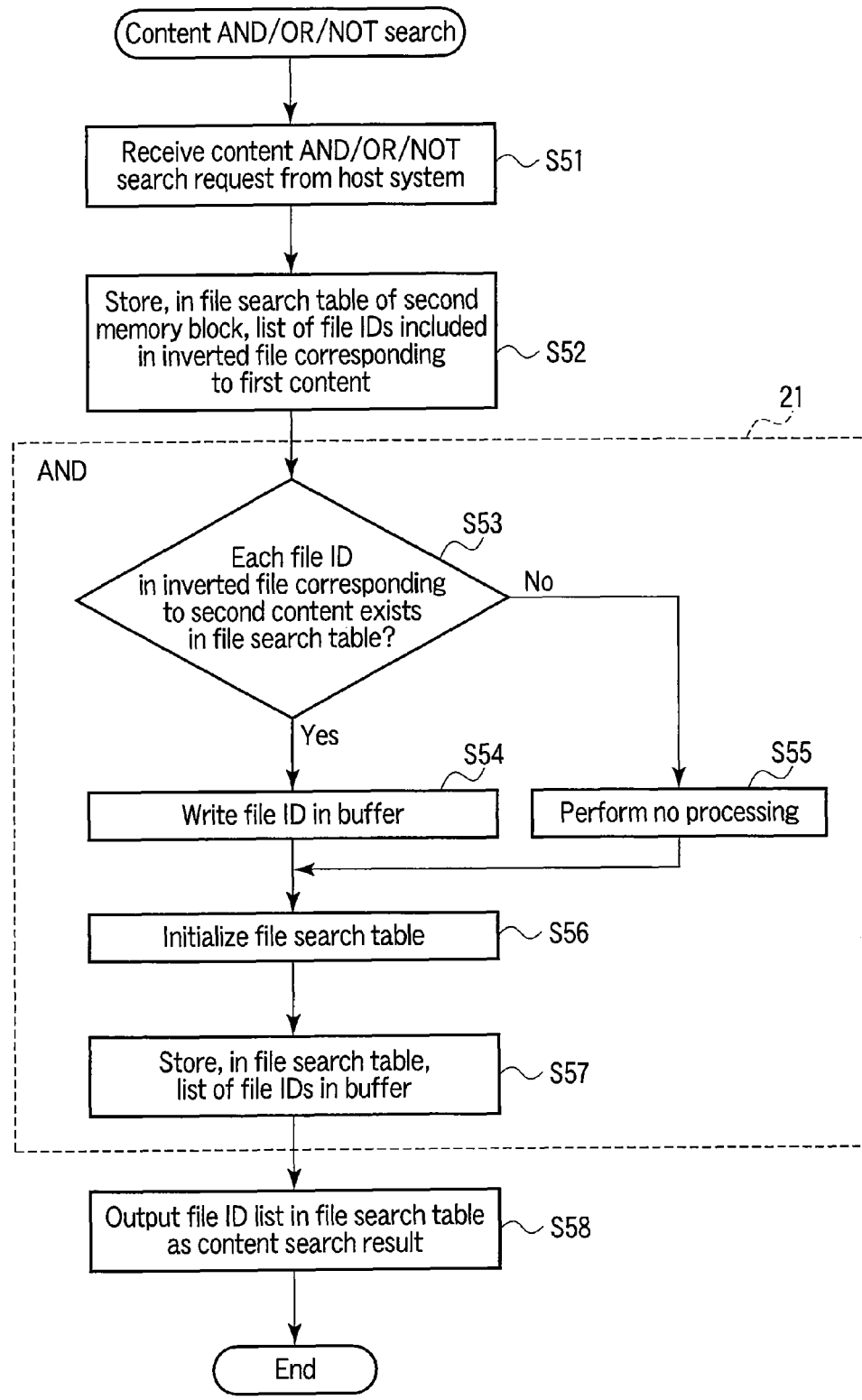
FIGS. 6, 7, and 8 are flowcharts illustrating content search processing in a storage device according to a second embodiment.
Figure 7:
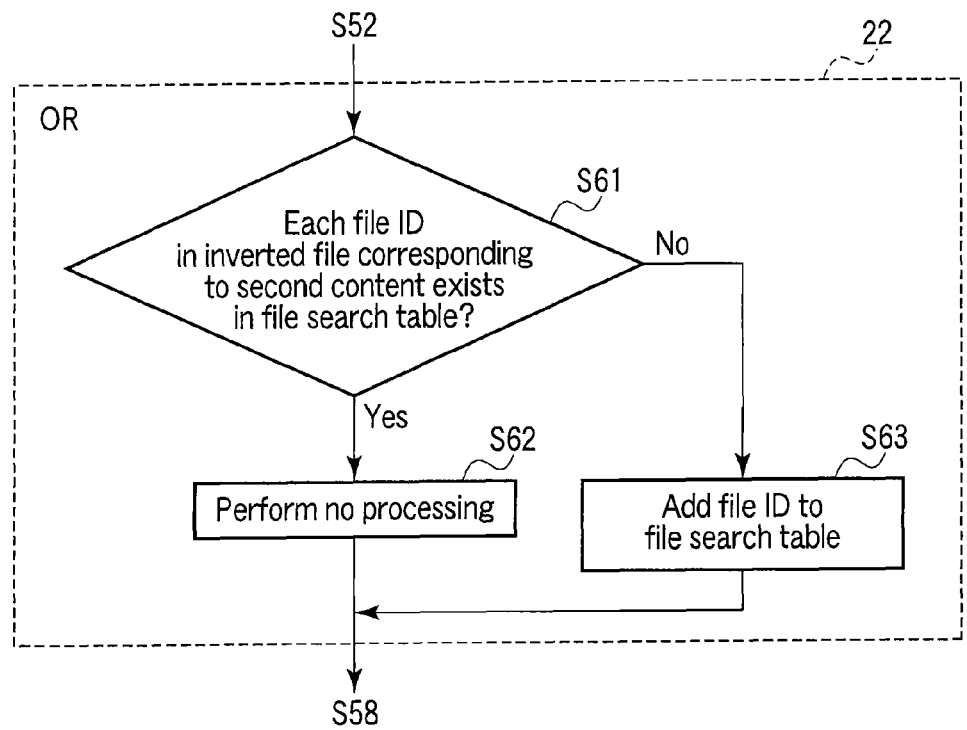
Figure 8:
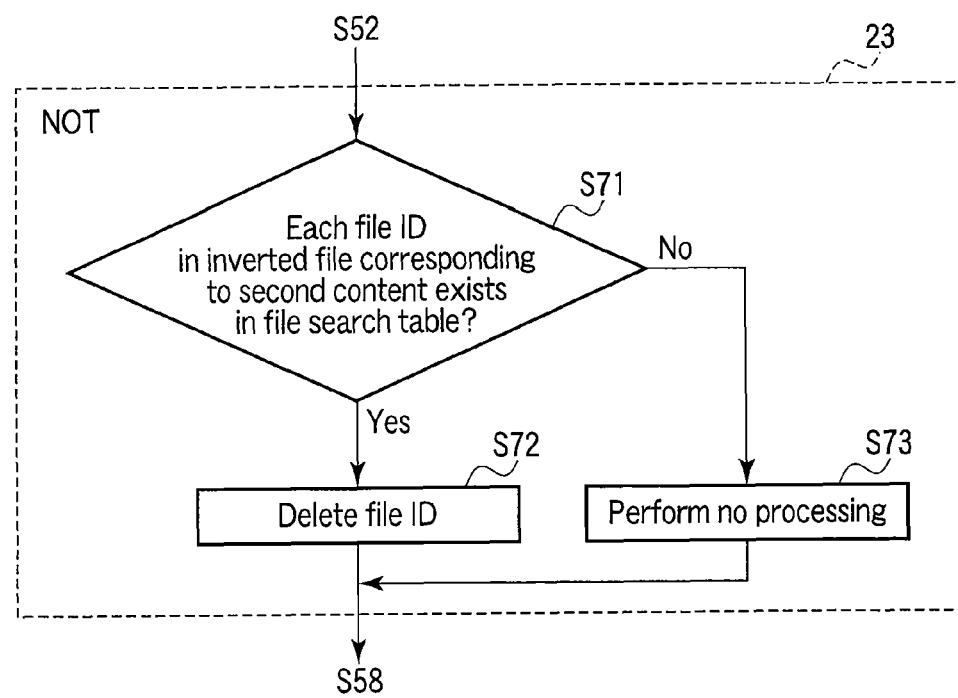

FIGS. 6, 7, and 8 are flowcharts illustrating content search processing in the storage device according to the second embodiment.

(1) A host interface 11 receives a content AND/OR/NOT search request from the host system (step S51).

(2) A controller 14 stores, in a file search table 131 of a second memory block 13, a list of file IDs stored in the inverted file corresponding to the first search target content (step S52).

(3) The controller 14 rewrites the description of the file search table 131 in accordance with the Boolean operator in the following way for each file ID stored in the inverted file corresponding to the second search target content.

An AND operation is represented by a process 21 in FIG. 6. The controller checks whether a file ID stored in the inverted file corresponding to the second content already exists in the file search table 131 (step S53).

If the file ID exists, it is written in the buffer (step S54). Part of the second memory block 13 is allocated as the buffer area. On the other hand, if the file ID does not exist, no processing is performed (step S55).

Finally, the file search table 131 is initialized (step S56). The list of file IDs written in the buffer is stored in the file search table 131 (step S57).

An OR operation is represented by a process 22 in FIG. 7. The controller checks whether a file ID stored in the inverted file corresponding to the second content already exists in the file search table 131 (step S61).

If the file ID exists, no processing is performed (step S62). On the other hand, if the file ID does not exist, it is added to the file search table 131 (step S63).

A NOT operation is represented by a process 23 in FIG. 8. The controller checks whether a file ID stored in the inverted file corresponding to the second content already exists in the file search table 131 (step S71).

If the file ID exists, it is deleted from the file search table 131 (step S72). On the other hand, if the file ID does not exist, no processing is performed (step S73).

(4) The controller 14 outputs the file ID list stored in the file search table 131 via the host interface 11 as a content search result (step S58).

According to the second embodiment, since the controller in the storage device performs inverted file management and Boolean operation, these processes can be executed at a high speed without any limitation by the communication speed of the host interface. That is, it is possible to implement a storage device having a Boolean operation function including AND/OR/NOT for a plurality of content search results, in addition to the effects of the first embodiment. The remaining components and effects are the same as in the first embodiment.

[3] Third Embodiment

A storage device according to the third embodiment will be described next.

The storage device according to the third embodiment can implement a function of quickly searching for the address of an inverted file corresponding to a content and speedup of a Boolean operation including AND/OR/NOT for a plurality of content search results, in addition to the processes of the second embodiment.

[3-1] Hardware Configuration

The hardware configuration of the storage device according to the third embodiment will be described.

Figure 9:
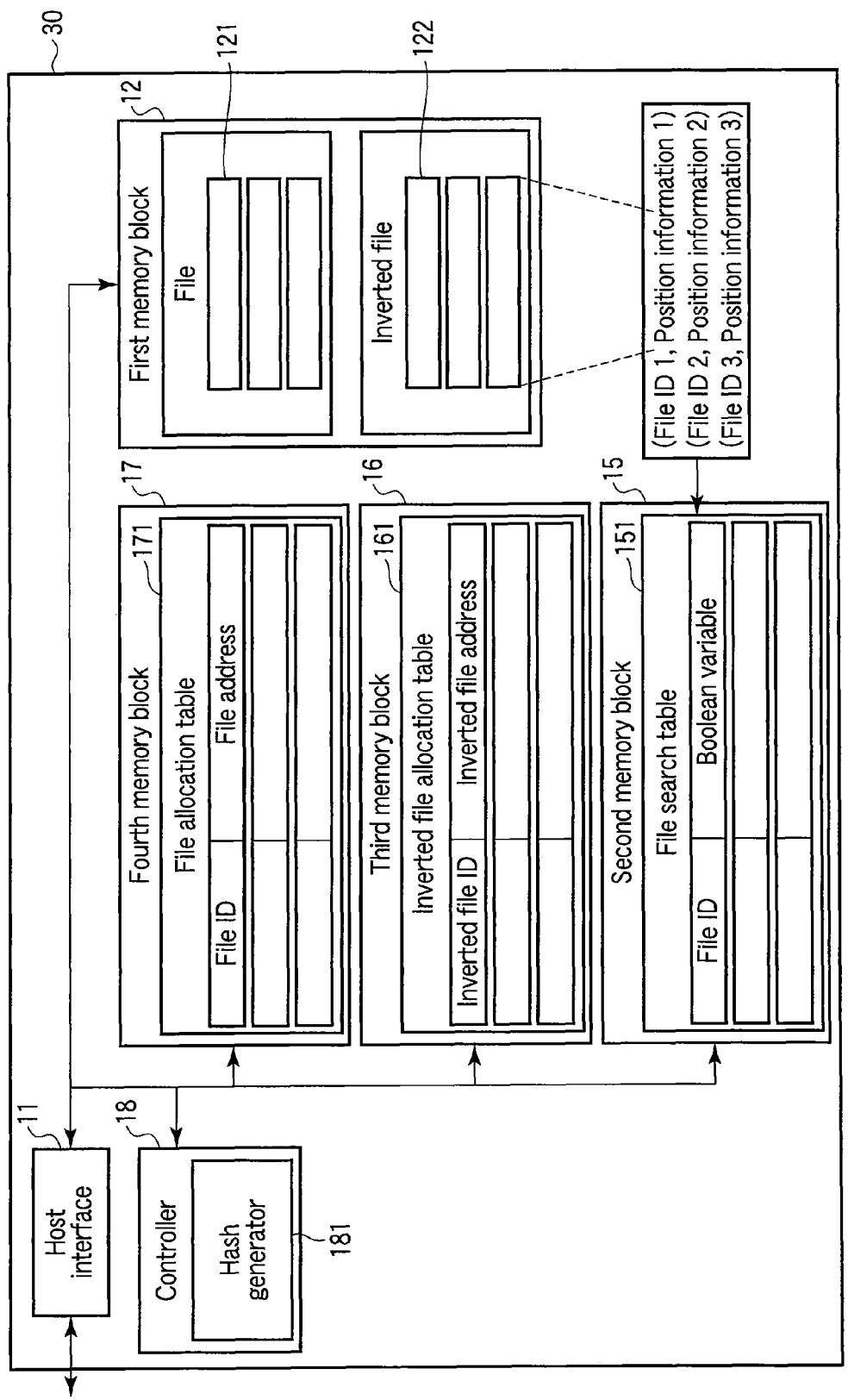
FIG. 9 is a block diagram showing the hardware configuration of a storage device according to a third embodiment.

FIG. 9 is a block diagram showing the hardware configuration of the storage device according to the third embodiment.

As shown in FIG. 9, a storage device 30 includes a host interface 11, first memory block 12, second memory block 15, third memory block 16, fourth memory block 17, and controller 18.

The controller 18 includes a hash generator 181. The hash generator 181 converts arbitrary length bit data into fixed length bit data by a hash function. The hash generator 181 here generates an inverted file ID of fixed length bit data from a content of arbitrary length bit data using the function. The hash generator 181 also generates a file ID of fixed length bit data from arbitrary length bit data capable of specifying a file.

As the hash function, a cryptologic hash function that is as uniform and sparse as possible is preferable. For example, CRC (Cyclic Redundancy Check), SHA-1 (Secure Hash Algorithm-1), SHA-2 (Secure Hash Algorithm-1), MD4 (MessageDigest4), or MD5 (MessageDigest5) is used.

The hash generator 181 may have a function of converting a fixed length bit string generated in accordance with a hash function into a desired bit length. For example, the hash generator 181 has a modular arithmetic function represented by $$<\text{key ID}>=\text{cryptologic\_hash}(<\text{key}>) \bmod \text{BitLength}$$

The second memory block 15 is connected to the host interface 11, first memory block 12, third memory block 16, fourth memory block 17, and controller 18. The second memory block 15 stores a file search table 151 which is an array having, as elements, sets of file IDs and variables that store Boolean operation results. The position of each element in the file search table 151 is determined by information included in the file ID of the element itself. In other words, each file ID includes the position information of each element in the file search table 151.

The third memory block 16 is connected to the host interface 11, first memory block 12, second memory block 15, fourth memory block 17, and controller 18. The third memory block 16 stores an inverted file allocation table 161 which is an array having, as elements, sets of IDs and addresses of the inverted files. The position of each element in the inverted file allocation table 161 is determined by information included in the inverted file ID of the element itself. In other words, each inverted file ID includes the position information of each element in the inverted file allocation table 161.

The fourth memory block 17 is connected to the host interface 11, first memory block 12, second memory block 15, third memory block 16, and controller 18. The fourth memory block 17 stores a file allocation table 171 which is an array having, as elements, sets of IDs and addresses of the files. The position of each element in the file allocation table 171 is determined by information included in the file ID of the element itself. In other words, each file ID includes the position information of each element in the file allocation table 171.

One or both of the file ID and the inverted file ID are generated as fixed length bit data by the hash generator 181.

[3-2] Hash Table Data Structure

A hash table data structure is applicable to the inverted file allocation table 161, file search table 151, or file allocation table 171. A hash table data structure stores, as elements, sets of key IDs and values corresponding to them.

As a characteristic feature of the hash table data structure, the position of each element to be registered is determined by information included in the key ID of the element itself. The characteristic feature of the data structure makes it possible to quickly determine whether a search target key ID is registered and, if the key ID is registered, acquire a value corresponding to the search target key ID (convert the key ID into a value). According to this embodiment, it is possible to implement, using this structure, high-speed search of the address of an inverted file corresponding to a content, speedup of a Boolean operation including AND/OR/NOT for a plurality of content search results, and high-speed search of the address of a file corresponding to a file ID.

[3-2-1] First Example of Hash Table Data Structure

Figure 10A:
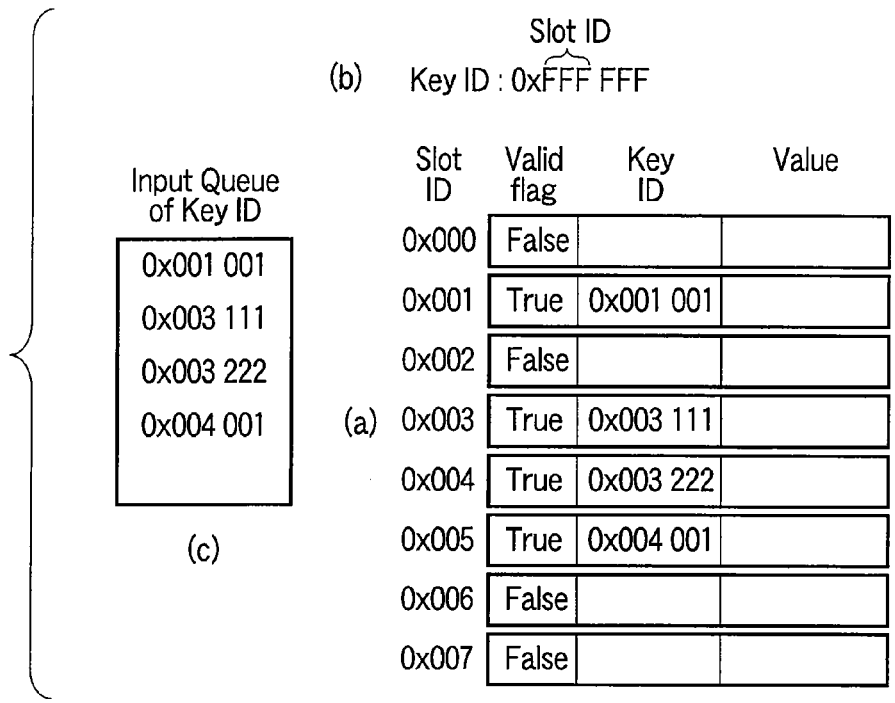
FIG. 10A is a view showing the first example of a hash table data structure.

In FIG. 10A, (a) illustrates a first example of the hash table data structure.

As indicated by (a) of FIG. 10A, the hash table data structure is an array having, as elements, sets of valid flags, key IDs, and corresponding values. The position of each element in the array is represented by a slot ID.

A slot ID is generated from a key ID by the controller. In this case, as indicated by (b) of FIG. 10A, the 12-bit prefix of a key ID is used as a slot ID. When the key ID has m bits, and the slot ID has n bits, m>n holds (m and n are integers of 1 or more). In FIG. 10A, (c) shows key IDs that await registration, and (a) represents a state in which the key IDs awaiting registration indicated by (c) are registered in the hash table data structure.

Element registration and element search procedures in the hash table data structure (first example) will be described below.

(Element Registration Procedure)

A procedure of registering a set of a key ID and a corresponding value in the hash table data structure will be explained here.

Figure 11:
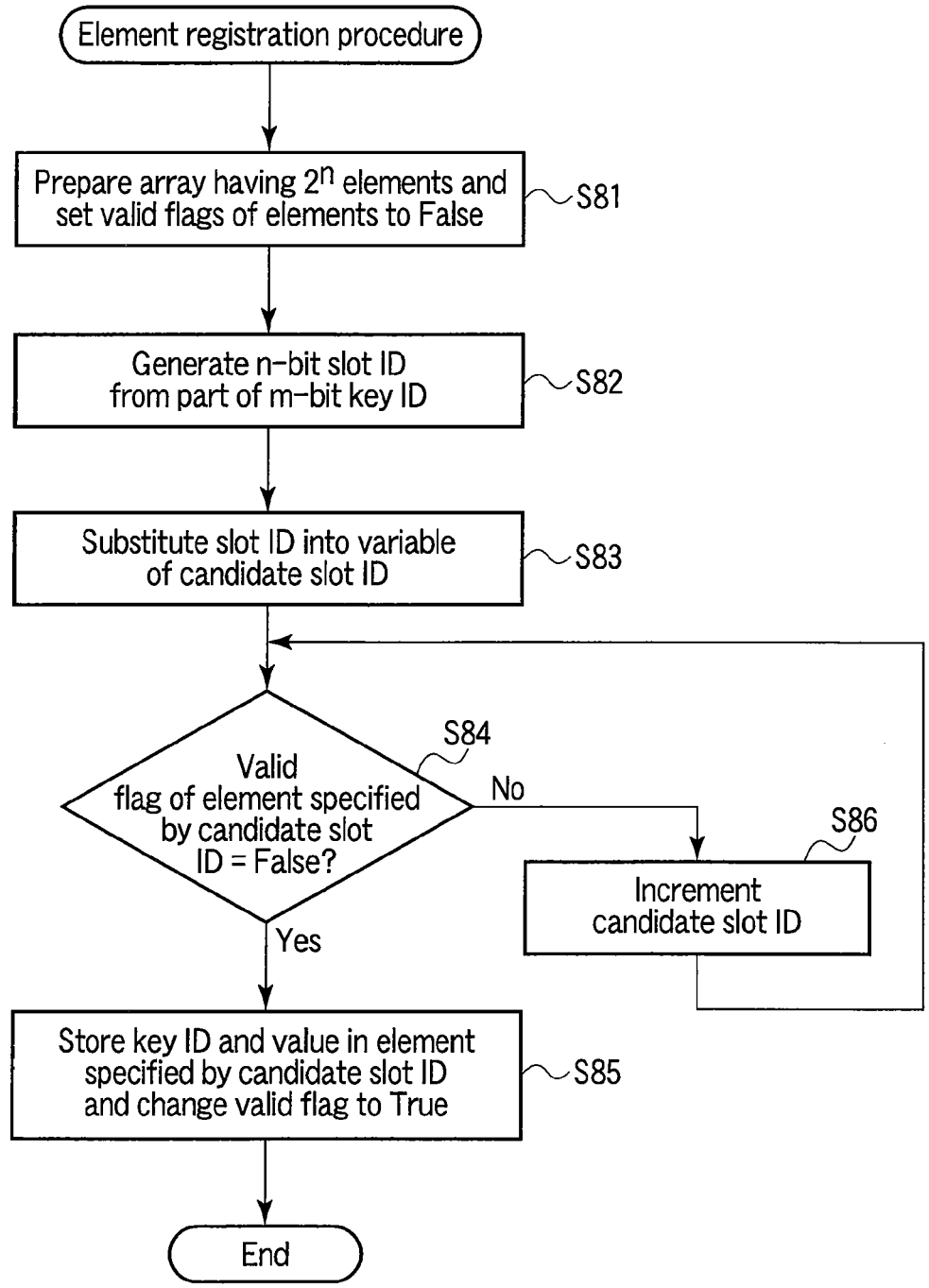
FIG. 11 is a flowchart illustrating an element registration procedure (first example) according to the third embodiment.

FIG. 11 is a flowchart illustrating an element registration procedure (first example) according to the third embodiment.

The controller 18 has a memory area to store a candidate slot ID, and manages the variable of the candidate slot ID.

(1) (Initialization) The controller 18 prepares an array having $2^n$ elements, and sets the valid flags of all elements to False (step S81).

(2) (Candidate Slot ID) The controller 18 generates an n-bit slot ID from part of an m-bit key ID to be registered (step S82). For example, as indicated by (b) of FIG. 10A, the 12-bit prefix of a 24-bit key ID is defined as a slot ID. The slot ID is substituted into the variable of the candidate slot ID (step S83).

(3) (Specifying Next Registration Slot) The controller 18 determines whether the valid flag of the element specified by the candidate slot ID is False (step S84). If the valid flag is False (Yes), the process advances to step S85. On the other hand, if the valid flag is not False but True (No), the candidate slot ID is incremented (step S86), and the process returns to step S84 again.

(4) (Registration) The controller 18 stores the key ID to be registered and the value in the element specified by the candidate slot ID, and changes the valid flag to True (step S85).

(Element Search Procedure)

A procedure of obtaining a value corresponding to a search target key ID will be explained here.

Figure 12:
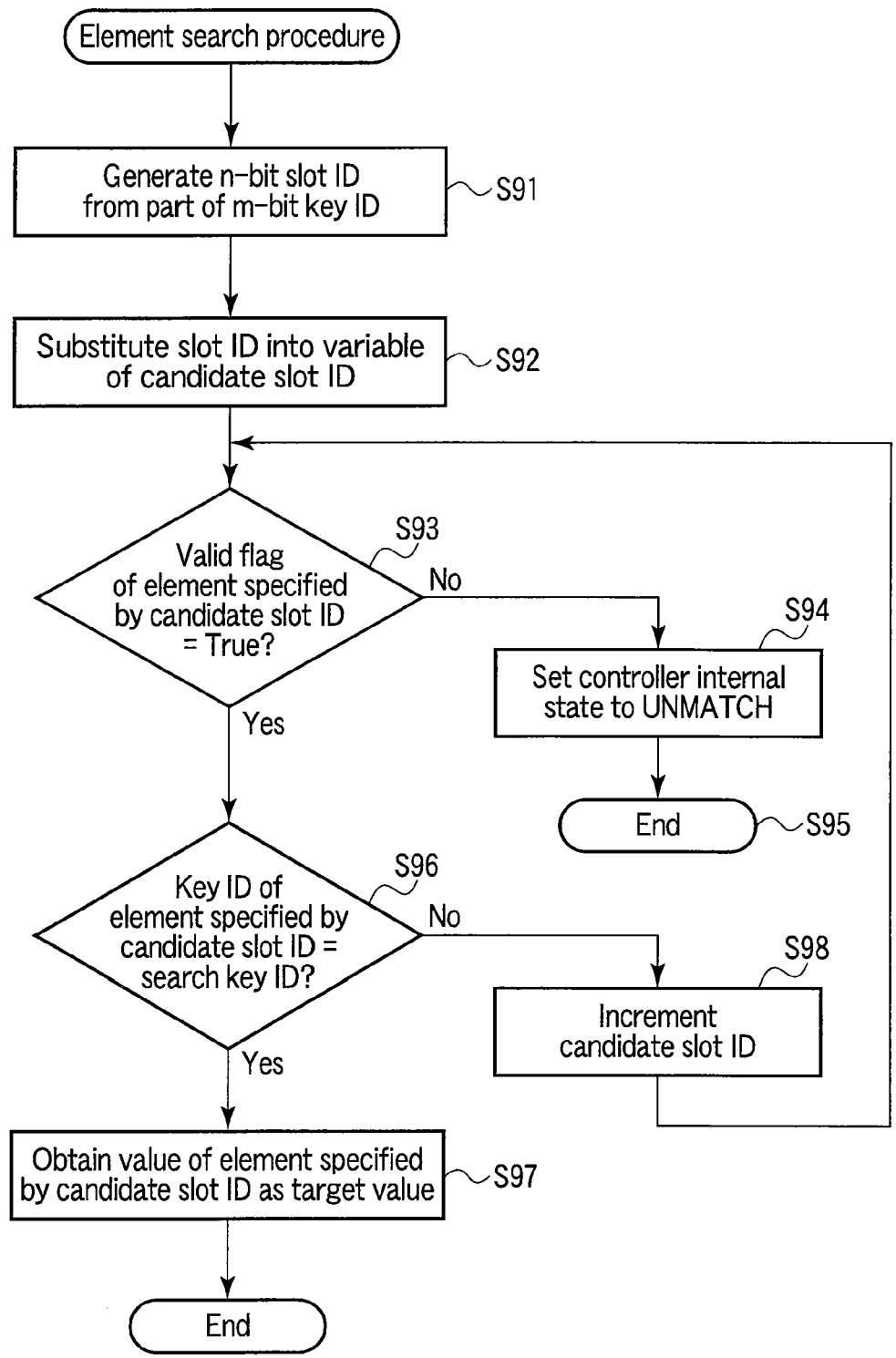
FIG. 12 is a flowchart illustrating an element search procedure (first example) according to the third embodiment.

FIG. 12 is a flowchart illustrating an element search procedure (first example) according to the third embodiment.

(1) (Candidate Slot ID) The controller 18 generates an n-bit candidate slot ID from part of an m-bit search target key ID in accordance with the same procedure as the registration procedure shown in FIG. 11 (steps S91 and S92).

(2) (Specifying Slot Corresponding to Search Key) The controller 18 determines whether the valid flag of the element specified by the candidate slot ID is True (step S93). If the valid flag is not True but False (No), the controller sets its internal state to UNMATCH, and ends the search procedure (steps S94 and S95). On the other hand, if the valid flag is True (Yes), the process advances to step S96.

The controller 18 determines whether the key ID of the element specified by the candidate slot ID is the same as the search target key ID (step S96). If the key ID is the same as the search target key ID (Yes), the process advances to step S97. On the other hand, if the key ID is different from the search target key ID (No), the candidate slot ID is incremented (step S98), and the process returns to step S93 again.

(3) (Output) The controller 18 obtains the value of the element specified by the candidate slot ID as the target value (step S97).

[3-2-2] Second Example of Hash Table Data Structure

Figure 10B:
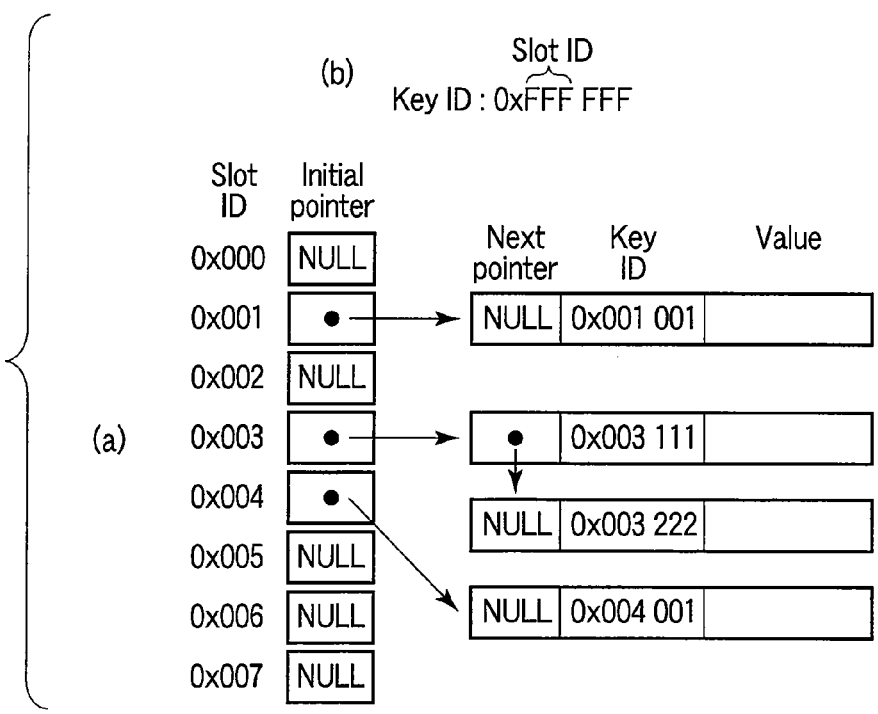
FIG. 10B is a view showing the second example of a hash table data structure.

In FIG. 10B, (a) illustrates a second example of the hash table data structure.

As indicated by (a) of FIG. 10B, the hash table data structure is formed from a pointer array having pointers as elements and a connection list having, as elements, sets of pointers, key IDs, and values corresponding to them. The position of each element in the pointer array is represented by a slot ID.

As in the first example, a slot ID is generated from a key ID by the controller. In this case, as indicated by (b) of FIG. 10B, the 12-bit prefix of a key ID is used as a slot ID. When the key ID has m bits, and the slot ID has n bits, m>n holds. In FIG. 10B, (a) represents a state in which the key IDs waiting registration indicated by (c) of FIG. 10A are registered in the hash table data structure.

Element registration and element search procedures in the hash table data structure (second example) will be described below.

(Element Registration Procedure)

A procedure of registering a set of a key ID and a corresponding value will be explained here.

FIG. 13 is a flowchart illustrating an element registration procedure (second example) according to the third embodiment.

The controller 18 has a memory area to store a candidate slot ID and a candidate pointer, and manages the variables of the candidate slot ID and candidate pointer.

(1) (Initialization) The controller 18 prepares a pointer array having 2n elements, and sets the pointers of all elements to NULL (step S101).

(2) (Slot ID) The controller 18 generates an n-bit slot ID from part of an m-bit key ID to be registered (step S102). For example, as indicated by (b) of FIG. 10B, the 12-bit prefix of a 24-bit key ID is extracted and defined as a candidate slot ID (step S103).

(3) (Specifying Next Registration Entry) The controller 18 determines whether the element of the pointer array specified by the candidate slot ID is NULL (step S104). If the element of the pointer array is NULL (Yes), the controller creates an element of the connection list, and stores the pointer to it in both the candidate pointer and the element of the pointer array specified by the candidate slot ID (step S105). Then, the process advances to step S110. On the other hand, if the element of the pointer array is not NULL (No), the pointer is set in the candidate pointer (step S106), and the process advances to step S107.

The controller determines whether the pointer of the element of the connection list specified by the candidate pointer is NULL (step S107). If the pointer is NULL (Yes), the controller creates an element of the connection list, and stores the pointer to it in both the candidate pointer and the pointer of the element of the connection list specified by the candidate pointer (step S108). Then, the process advances to step S110. On the other hand, if the pointer is not NULL (No), the pointer is set in the candidate pointer (step S109), and the process returns to step S107.

(4) (Registration) The controller 18 stores the key ID and the value in the element of the connection list specified by the candidate pointer (step S110).

(Element Search Procedure)

A procedure of obtaining a value corresponding to a search target key ID will be explained here.

FIG. 14 is a flowchart illustrating an element search procedure (second example) according to the third embodiment.

(1) (Candidate Slot ID) The controller 18 generates an n-bit candidate slot ID from part of an m-bit search target key ID in accordance with the same procedure as the registration procedure shown in FIG. 13 (steps S111 and S112).

(2) (Specifying Slot Corresponding to Search Key) The controller 18 determines whether the pointer of the element of the pointer array specified by the candidate slot ID is NULL (step S113). If the pointer is NULL (Yes), the controller sets its internal state to UNMATCH, and ends the search procedure (steps S114 and S115). On the other hand, if the pointer is not NULL (No), the pointer is stored in the candidate pointer (step S116), and the process advances to step S117.

In step S117, the controller 18 determines whether the key ID of the element of the connection list specified by the candidate pointer is the same as the search target key ID. If the key ID is the same as the search target key ID (Yes), the process advances to step S122.

On the other hand, if the key ID is different from the search target key ID (No), the controller determines whether the pointer of the element of the connection list specified by the candidate pointer is NULL (step S118). If the pointer is NULL (Yes), the controller sets its internal state to UNMATCH, and ends the search procedure (steps S119 and S120). On the other hand, if the pointer is not NULL (No), the pointer is stored in the candidate pointer (step S121), and the process returns to step S117.

(3) (Output) In step S122, the controller 18 obtains the value of the element specified by the candidate pointer as the target value.

Note that to reduce the memory capacity needed to create the hash table data structure, each element of the connection list may have the remaining m-n bit portion of the key ID that does not serve as the slot ID, instead of the key ID itself.

[3-3] Inverted File Allocation Table

When the hash table data structure is applied to the inverted file allocation table 161 of the third memory block 16, the following processing is performed. The key IDs and values in the hash table data structure are set as the inverted file IDs and inverted file addresses in the inverted file allocation table 161, respectively.

(1) The controller 18 causes the hash generator 181 to generate an inverted file ID from data of a content.

(2) The controller 18 converts the inverted file ID into an inverted file address in accordance with the inverted file allocation table 161. That is, the address of the inverted file is obtained from the inverted file ID. The controller 18 can thus access the inverted file corresponding to the content at a high speed.

[3-4] File Allocation Table

When the hash table data structure is applied to the file allocation table 171 of the fourth memory block 17, the following processing is performed.

When fixed length bit data generated by the hash generator 181 from arbitrary length bit data capable of specifying a file is used as a file ID, the file ID needs to be able to reversely specify the original file. For this purpose, in this embodiment, the file allocation table 171 is prepared in the fourth memory block 17.

The key IDs and values in the above-described hash table data structure are set as the file IDs and file address in the file allocation table 171, respectively.

(1) The controller 18 causes the hash generator 181 to generate a file ID from arbitrary length bit data capable of specifying a file.

(2) The controller 18 obtains a file address from the file ID in accordance with the file allocation table 171. Thus, the controller 18 accesses the file corresponding to the file ID at a high speed.

[3-5] File Search Table

When the hash table data structure is applied to the file search table 151 of the second memory block 15, the following processing is performed.

Figure 15:
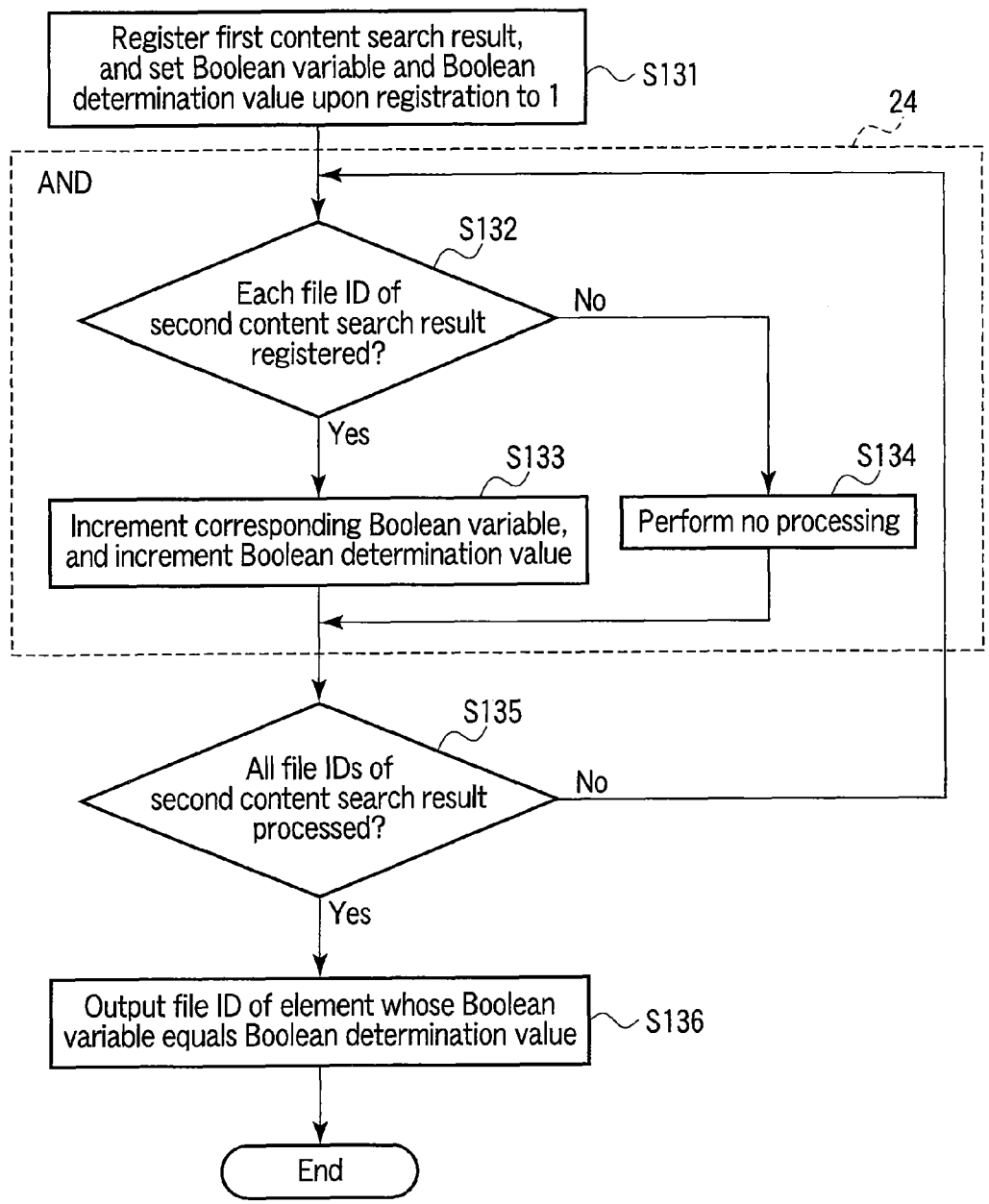
FIGS. 15, 16, and 17 are flowcharts illustrating content search processing in the storage device according to the third embodiment.
Figure 16:
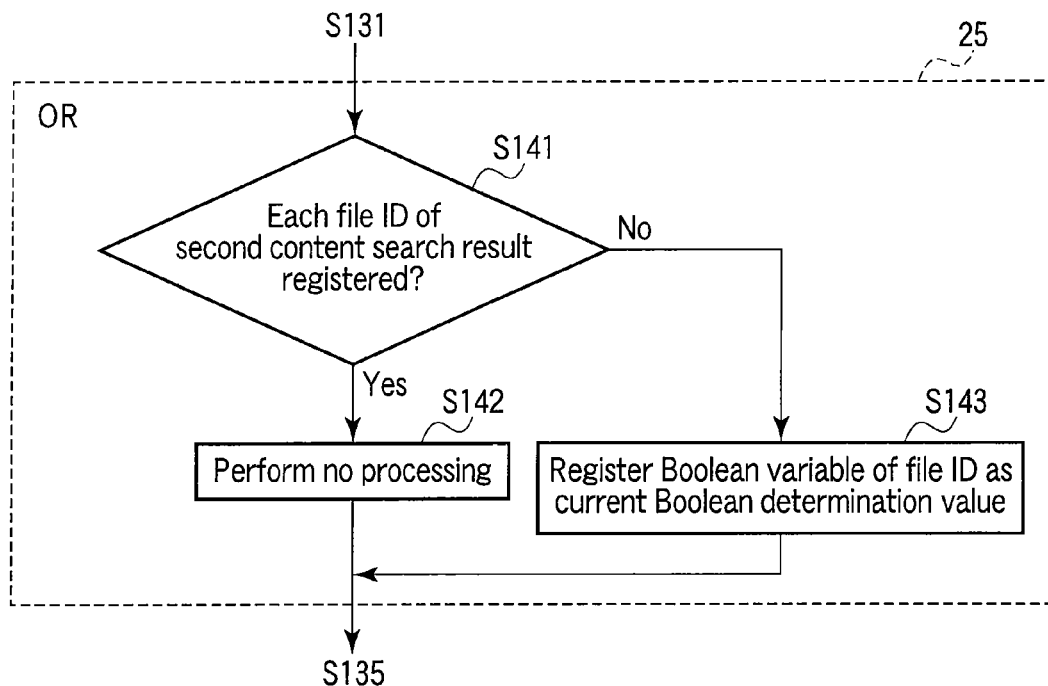
Figure 17:
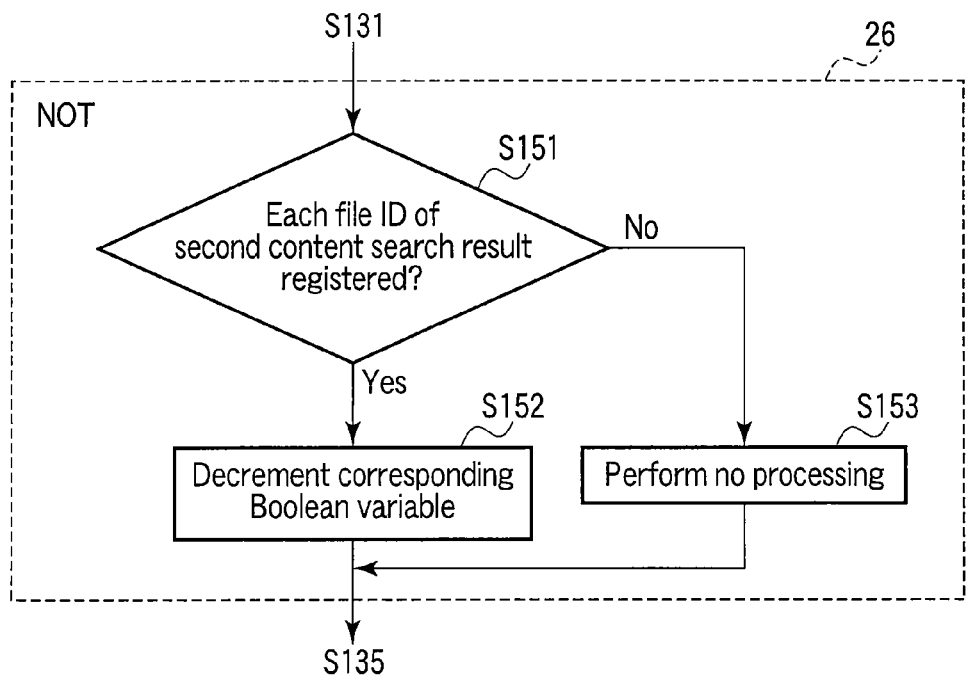

FIGS. 15, 16, and 17 are flowcharts illustrating content search processing in the storage device according to the third embodiment.

The key IDs and values in the above-described hash table data structure are set as the file IDs and the variables of Boolean operation results (to be referred to as Boolean variables hereinafter) in the second memory block 15, respectively. The controller 18 has a memory area to store the determination value of a Boolean operation result (to be referred to as a Boolean determination value hereinafter), and manages the Boolean determination value.

(1) The controller 18 extracts file IDs from a list of file IDs stored in the inverted file corresponding to the first search target content one by one. In accordance with the above-described registration procedure, each file ID is registered in the file search table 151 together with a Boolean variable "1". The Boolean determination value is set to 1 (step S131).

(2) The controller 18 rewrites the description of the file search table 151 in accordance with the Boolean operator in the following way for each file ID stored in the inverted file corresponding to the second search target content.

An AND operation is represented by a process 24 in FIG. 15. The controller checks whether a file ID stored in the inverted file corresponding to the second content is already registered in the file search table 151 (step S132). If the file ID is registered (Yes), the corresponding Boolean variable is incremented. In addition, the Boolean determination value is incremented (step S133). On the other hand, if the file ID is not registered (No), no processing is performed (step S134), and the process advances to step S135.

An OR operation is represented by a process 25 in FIG. 16. The controller checks whether a file ID stored in the inverted file corresponding to the second content is already registered in the file search table 151 (step S141). If the file ID is registered (Yes), no processing is performed (step S142), and the process advances to step S135. On the other hand, if the file ID is not registered (No), the file ID is registered in the file search table 151, and the Boolean variable corresponding to the file ID is set to the current Boolean determination value (step S143).

A NOT operation is represented by a process 26 in FIG. 17. The controller checks whether a file ID stored in the inverted file corresponding to the second content is already registered in the file search table 151 (step S151). If the file ID is registered (Yes), the Boolean variable corresponding to the file ID is decremented (step S152). On the other hand, if the file ID is not registered (No), no processing is performed (step S153), and the process advances to step S135.

(3) In step S135, the controller 18 checks whether all file IDs stored in the inverted file corresponding to the second content have been processed. If all file IDs have been processed (Yes), the controller outputs the file ID of an element whose Boolean variable equals the Boolean determination value (step S136). On the other hand, if not all file IDs have been processed (No), the process returns to step S132 in the AND operation, step S141 in the OR operation, or step S151 in the NOT operation.

According to the third embodiment, in addition to the effect of the second embodiment, it is possible to search for the address of an inverted file corresponding to a search target content at a high speed using the inverted file allocation table 161. In addition, a Boolean operation including AND/OR/NOT for a plurality of content search results can be executed at a high speed using the file search table 151. The remaining components and effects are the same as in the first and second embodiments.

[4] Fourth Embodiment

A storage device according to the fourth embodiment will be described next.

The storage device according to the fourth embodiment can implement further speedup of a Boolean operation including AND/OR/NOT for a plurality of content search results, in addition to the processes of the third embodiment.

[4-1] Hardware Configuration

The hardware configuration of the storage device according to the fourth embodiment will be described.

Figure 18:
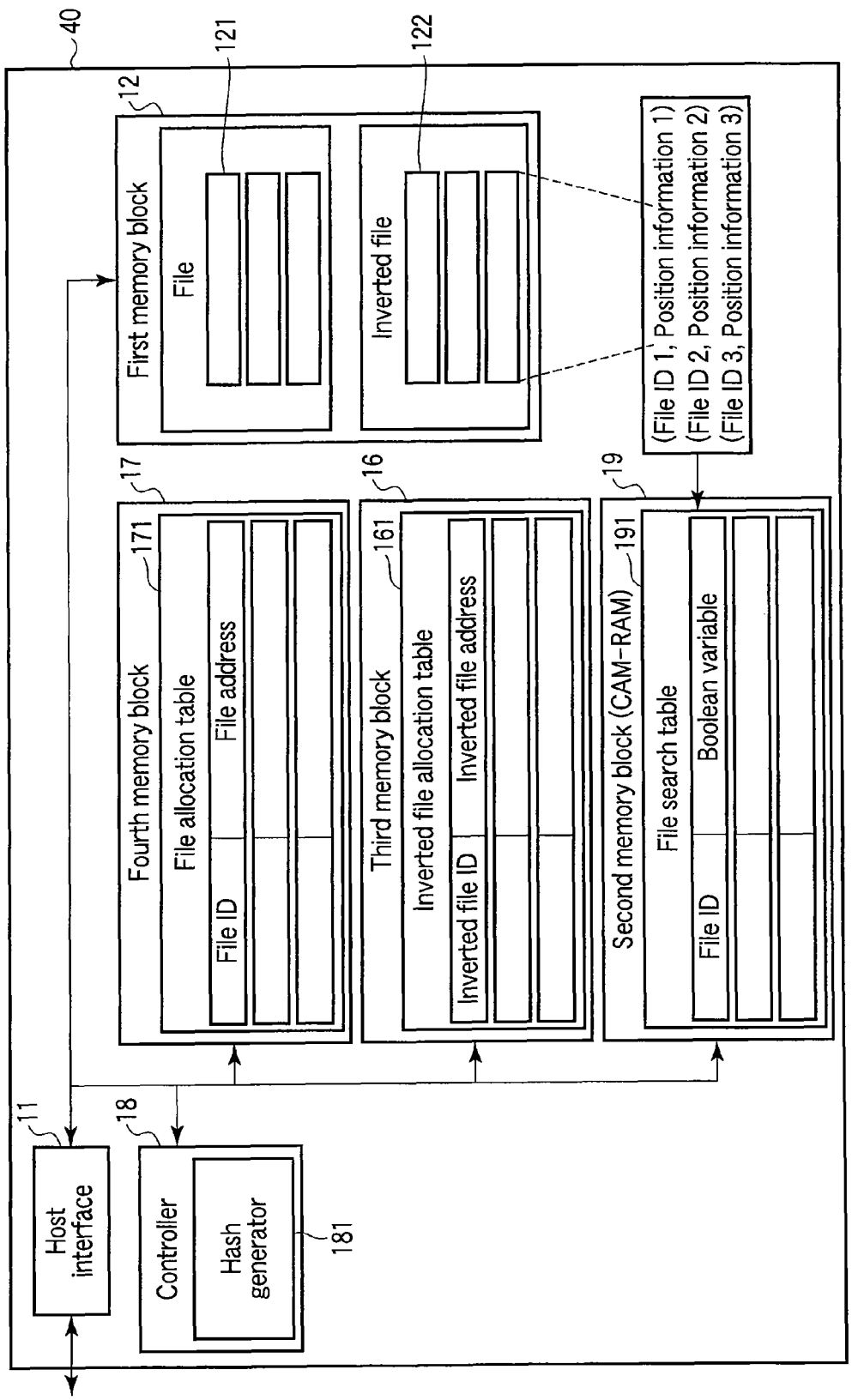
FIG. 18 is a block diagram showing the hardware configuration of a storage device according to a fourth embodiment.

FIG. 18 is a block diagram showing the hardware configuration of the storage device according to the fourth embodiment.

As shown in FIG. 18, a storage device 40 includes an interface 11, first memory block 12, second memory block 19, third memory block 16, fourth memory block 17, and controller 18.

The second memory block 19 is formed from a CAM-RAM system that combines a CAM (Content-Addressable Memory) and a RAM.

Figure 19:
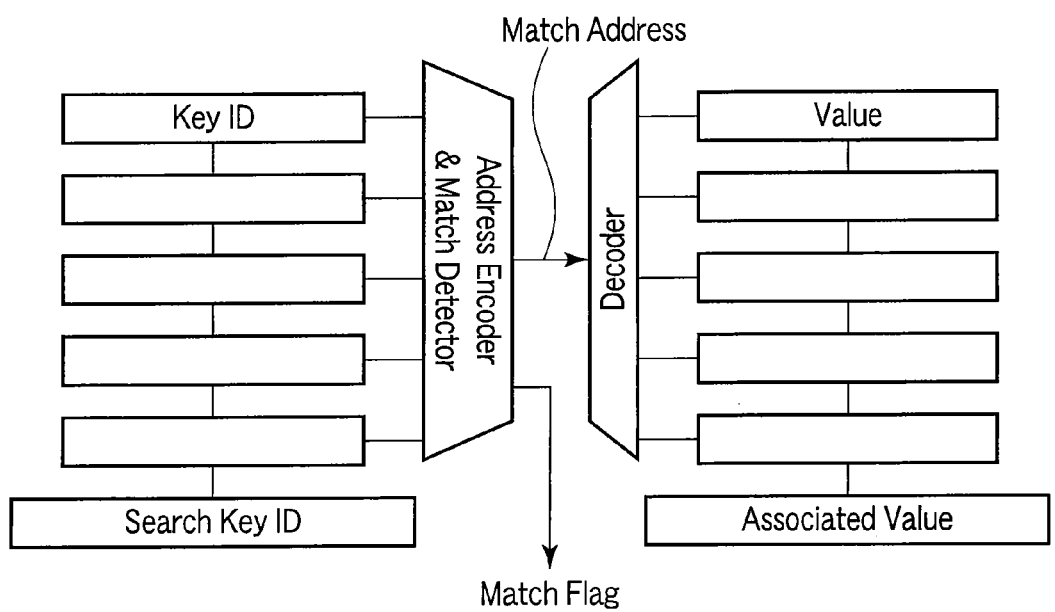
FIG. 19 is a block diagram showing an example of a CAM-RAM system.

The CAM-RAM system will be described with reference to FIG. 19. FIG. 19 illustrates an example of the CAM-RAM system.

A CAM is a special memory to be used for high-speed search, and has a function of, upon receiving search data, simultaneously performing comparison operations in parallel to determine match/mismatch between the search data and all stored data and outputting the addresses of matching stored data, unlike a normal memory which outputs data designated by an input address. The CAM also outputs presence/absence of matching data as Match Flag in data match search.

The CAM-RAM system is a system that combines the above-described CAM with an address-access RAM. The address encoder of the CAM and the address decoder of the RAM are designed so that an entry of the CAM is associated with an entry of the RAM in a one-to-one correspondence.

Sets of key IDs and values corresponding to them are stored in the CAM-RAM system. More specifically, key IDs and corresponding values are stored in the entries of the CAM and corresponding entries of the RAM, respectively.

Using the CAM-RAM system, the time needed for presence/absence determination of a search target key ID and if exists, acquisition of the value corresponding to the search target key ID (conversion from the key ID to the value) becomes shorter than in the above-described case wherein a hash table data structure is used.

[4-2] Content Search Processing

When the CAM-RAM system is applied to a file search table 191 of the second memory block 19, processing is performed in the following way.

The key IDs and values in the CAM-RAM system are set as the file IDs and Boolean variables in the file search table 191, respectively.

The controller 18 has a memory area to store a Boolean determination value, and manages the Boolean determination value. In accordance with the same procedure as in the third embodiment, the controller 18 executes a Boolean operation including AND/OR/NOT for a plurality of content search results.

In the fourth embodiment, the CAM-RAM system is used in the file search table 191. This enables to execute presence/absence determination of a search target key ID, and if exists, acquisition of the value corresponding to the search target key ID more quickly than in the case described in the third embodiment in which a hash table data structure is used. It is therefore possible to implement further speedup of a Boolean operation including AND/OR/NOT for a plurality of content search results.

Note that an example has been described above in which the CAM-RAM system is used in the file search table 191. However, the CAM-RAM system may be used in an inverted file allocation table 161 or a file allocation table 171, as a matter of course. In this case, content search processing can be performed more quickly than in the case wherein a hash table data structure is used in the inverted file allocation table 161 or file allocation table 171. The remaining components and effects are the same as in the third embodiment.

As described above, according to the embodiments, it is possible to provide a storage device capable of performing inverted file management and Boolean operation at a high speed without being limited by the communication speed of the host interface. In addition, it is possible to provide a storage device having not only an address-designated write/read function of a conventional storage device but also a full-text search function, and an efficient implementation method thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
an interface connected to a host system and configured to receive a request from the host system;
a first memory block configured to store inverted files that are created for each content, the inverted files storing IDs of files including each content;
a second memory block configured to store a file search table; and
a controller configured to control information transmission and reception with the interface, reading and writing to the first memory block, and reading and writing to the second memory block, without an external bus,
wherein the controller conducts a search by:
upon receiving a file write request via the interface, stores file IDs that are designated by the file write request in the inverted files corresponding to a content included in a file that is designated by the file write request,
upon receiving a content search request via the interface, stores, in the file search table, the file IDs stored in the inverted files that are identified based on the content designated by the content search request,
outputs the file IDs stored in the file search table from the interface as a search result for the content search request;
wherein upon receiving a Boolean operation request for the content search results corresponding to first and second contents via the interface, the controller stores, in the file search table, a list of file IDs stored in the inverted files corresponding to the first content, and rewrites the list of file IDs in the file search table in accordance with a Boolean operator for each file ID stored in the inverted files corresponding to the second content, and outputs the list of file IDs stored in the file search table from the interface.

2. The device according to claim 1, wherein upon receiving a Boolean operation request for a plurality of content search results via the interface, the controller performs the requested Boolean operation using the file search table, and outputs a result of the Boolean operation from the interface.

3. The device according to claim 2, wherein the file search table is a table including, as elements, sets of file IDs and variables storing a Boolean operation result.

4. The device according to claim 1, wherein if a received Boolean operator is AND, the controller stores, in the file search table, a list of file IDs stored in the inverted files corresponding to the first content, rewrites the list of file IDs in the file search table using file IDs pre-stored in the file search table among the file IDs stored in the inverted files corresponding to the second content, and outputs the list of file IDs stored in the file search table from the interface.

5. The device according to claim 1, wherein if a received Boolean operator is OR, the controller stores, in the file search table, a list of file IDs stored in the inverted files corresponding to the first content, adds, to the file search table, file IDs not pre-stored in the file search table among the file IDs stored in the inverted files corresponding to the second content, and outputs the list of file IDs stored in the file search table from the interface.

6. The device according to claim 1, wherein if a received Boolean operator is NOT, the controller stores, in the file search table, a list of file IDs stored in the inverted files corresponding to the first content, deletes, from the file search table, the file IDs of the files stored in the inverted files corresponding to the second content, and outputs the list of file IDs stored in the file search table from the interface.

7. The device according to claim 1, further comprising a hash generator converting arbitrary length bit data into fixed length bit data using a hash function,
wherein at least one of the file ID and the inverted file ID is fixed length data bit converted by the hash generator.

8. The device according to claim 7, further comprising a third memory block connected to the interface, the first memory block, the second memory block, and the controller, and configured to store an inverted file allocation table, the inverted file allocation table includes, as elements, sets of the inverted file IDs and positions of the inverted file,
wherein a position of each element in the inverted file allocation table is determined by information included in the inverted file ID of each element.

9. The device according to claim 1, wherein a position of the element in the file search table is determined by information included in the file ID of the element.

10. The device according to claim 1, wherein the file search table of the second memory block includes a content-addressable memory (CAM).

11. An information processing system comprising a plurality of the storage devices according to claim 1, wherein the plurality of the storage devices are connected to the host system.

* * * * *